Nov. 24, 1964  T. P. MURRAY ETAL  3,158,675
APPARATUS FOR MEASURING THE THICKNESS OF THIN TRANSPARENT FILMS
Filed Nov. 10, 1959  2 Sheets-Sheet 1
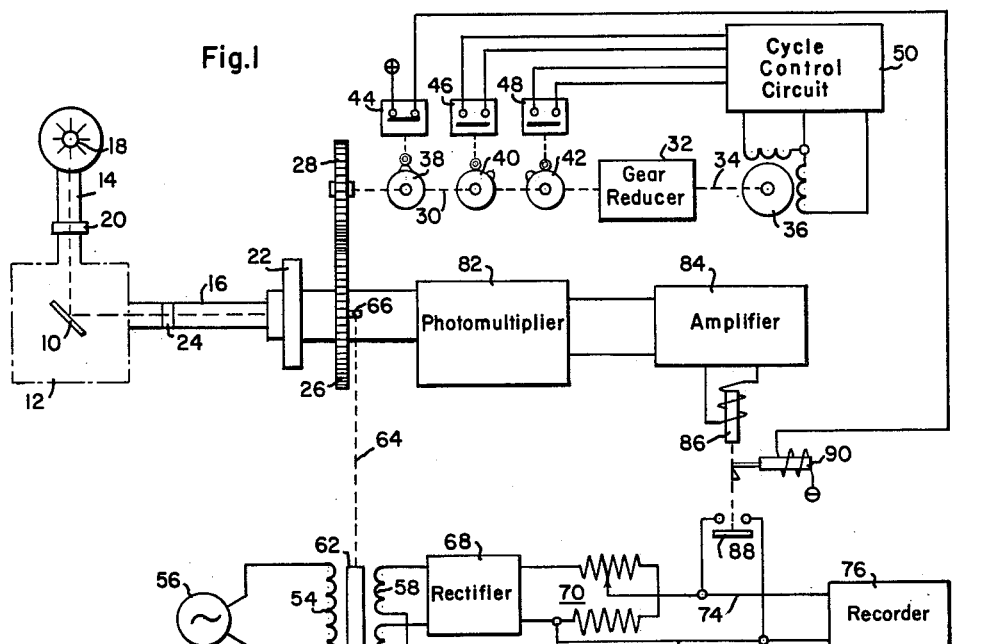
Fig.1
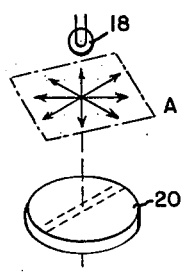
Fig.2
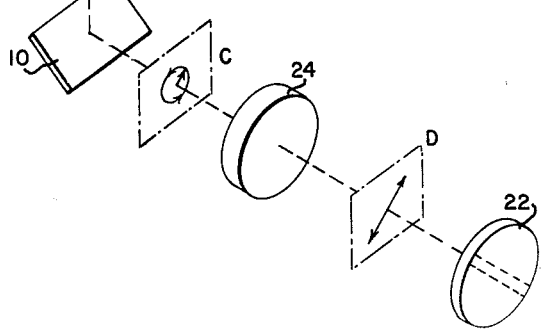
INVENTORS
Thomas P. Murray &
George T. Hanyo
BY
ATTORNEY Nov. 24, 1964 T. P. MURRAY ETAL 3,158,675
APPARATUS FOR MEASURING THE THICKNESS OF THIN TRANSPARENT FILMS
Filed Nov. 10, 1959 2 Sheets-Sheet 2

INVENTORS
Thomas P. Murray &
George T. Hanyo
BY
ATTORNEY

United States Patent Office 3,158,675
Patented Nov. 24, 1964

3,158,675
APPARATUS FOR MEASURING THE THICKNESS
OF THIN TRANSPARENT FILMS
Thomas P. Murray and George T. Hanyo, Pittsburgh,
Pa., assignors to Jones & Laughlin Steel Corporation,
Pittsburgh, Pa., a corporation of Pennsylvania
Filed Nov. 10, 1959, Ser. No. 852,061
12 Claims. (Cl. 88—14)

This invention relates to apparatus for determining the thickness of thin transparent films deposited on the surface of reflective material, and more particularly to apparatus for optically measuring such thicknesses.

Although not limited thereto, the present invention is particularly adapted for use in measuring the thickness of a protective oil film deposited on the surface of tin plate and other similar materials. In the manufacture of tin plate, for example, the final step in processing is the application of a very thin coating of oil, of the order of one ten-millionth of an inch thick. The primary purpose of this coating is to prevent marring of the surface during shipment and handling; however, it is also of some value in protecting the surface against oxidation and tarnishing. The coating must be thick enough to accomplish these purposes, yet thin enough so that it will not interfere with printing or laquering of the surface. The coating range is usually specified in terms of grams per basebox, where a "basebox" is 31,360 square inches of tin plate, with a total surface area of 62,720 square inches on both sides of the plate. Tin plate is usually produced with coatings in the range of about 0.05 through 0.50 gram per basebox. Each 0.10 gram per basebox corresponds to about one ten-millionth of an inch or 26 angstrom units. In order to avoid marring or scratching due to too little oil, or processing difficulties due to excessive oil, the application of this coating should be controlled within about plus or minus 0.05 gram per basebox or about 13 angstrom units.

In the past, two methods were generally used to measure oil coating weights and thicknesses. One of these is the solvent extraction method whereby the oil on the tin plate is dissolved in carbon tetrachloride or chlorothene, the solvent is evaporated, and the weight of the oil residue determined. In order to obtain enough oil for accurate weighing, about 600 square inches of tin plate must be employed. However, this method gives only the average value over the area employed (i.e., 600 square inches). Even with this amount of surface, the weight determined is only of the order of 0.1 to 1.0 milligram. The method is slow, incapable of point determinations, inherently not too accurate, and requires a skilled operator.

Another method previously used to measure coating thicknesses utilized the hydrophil balance. The measurement is made by first depositing the oil onto the surface of a distilled water bath by repeated immersion and withdrawal of the sample. Oil spreads into a monomolecular layer on the surface of the bath, and the area of the film is determined by collecting the oil between a movable dam and a sensing float. With such an arrangement, it is possible to obtain measurements on small areas so that the oil distribution, as well as the average, can be determined for a given sheet. This method, however, is not too accurate and requires a fair degree of skill on the part of the operator.

In contrast to previously used methods, the present invention measures the thickness of oil films and the like by the use of an optical instrument, known as an ellipsometer, in which ellipticity of polarized light reflected from a metal surface can be related to the thickness of a transparent film on the surface. When light polarized in a plane other than 0° or 90° to the plane of incidence is incident at an angle other than 0° or 90° on a metallic surface, the reflected light is elliptically polarized. The ellipticity of the reflected light depends upon the angle of incidence, the wave length, and the plane of polarization of the incident light, and upon the optical constants of the metallic reflecting surface. The ellipticity of the reflected light is altered by the presence of any film on the metal surface, depending upon the optical constants of the film and its thickness.

One straightforward way of measuring the ellipticity of the reflected light is to pass the reflected beam through a quarter-wave plate and an analyzer, and to rotate both of these until a null position (i.e., point of minimum light intensity through the analyzer) is observed. An apparatus for doing this is termed an ellipsometer. This then tells the observer: (1) the orientation in space of the ellipse from the quarter-wave plate setting, and (2) the ratio of its axes from the analyzer setting. These two parameters suffice to specify the ellipse. Through a set of trigonometric equations, one can then compute the amplitude and phase of the components of polarization in and perpendicular to the plane of incidence. In theoretical studies of metallic reflection of polarized light in the presence of a film, these are the quantities normally related to the parameters of the film and the metal. When the measurement of films of a given composition over a restricted range of thickness is desired, a much simpler empirical procedure is possible. One can then leave the quarter-wave plate in a fixed position (a suitable position being determined experimentally), and measure only the change in analyzer position for minimum light intensity with films of known thicknesses. This yields a calibration curve relating film thickness to analyzer position. Thus, the thickness of an unknown film may be determined by comparing the analyzer null position with the calibration curve, assuming that the optical constants of the reflecting surface and the angle of incidence, wave length and plane of polarization of the incident light are the same as they were when the instrument was calibrated.

The present invention has as its primary object the provision of apparatus employing an optical ellipsometer for measuring the thickness of thin transparent films deposited on the surface of reflective material.

More generally, an object of the invention is to provide a new and improved apparatus for determining transparent film thicknesses.

Another object of the invention is to provide apparatus for measuring the thickness of transparent films which is simple and does not require the services of skilled operating personnel.

Before an ellipsometer may be used to measure film thicknesses, it usually must be calibrated. In the case of single films deposited on clean oxide-free surfaces, the instrument may be calibrated by depositiing on the surface successive monomolecular layers of the film material in question, or a material having the same refractive index. The analyzer position for minimum light intensity (i.e., the null) may be first determined, and then one or more monomolecular layers may be deposited and the new analyzer position observed for minimum light intensity. In this way, a calibration curve may be constructed for film thickness versus analyzer position, or change in analyzer position. The thickness of the various monomolecular layers may be determined from the experimental data and ellipsometer theory or by independent methods (i.e., by X-ray, for example).

Although the foregoing method is satisfactory when the reflecting surface is clean and oxide free, it is inadequate for measuring oil coating thicknesses on tin plate where it is necessary to determine the thickness of the oil film in the presence of a second film consisting of a substrate of tin oxide of unknown thickness. Furthermore, since tin crystals are optically anisotropic, the state of polarization of the reflected light is dependent upon the orientation of the tin crystals with respect to the incident light beam. Both of these difficulties may be satisfactorily overcome by making a differential reading, with and without the film on the metal, with the sample placed in the same position and orientation in the sample holder for both readings. In the case of calibration films, readings may be made on the base metal containing the oxide, and then the film may be deposited and a second reading taken. The film thickness is then related to the difference in the analyzer position for the two readings. In the case of oil films, readings are made on the sample with the oil present, the film is then removed using a suitable solvent, and readings again made. Again, the film thickness is related to the difference in the two values of analyzer null position. Hereinafter, when the detailed measuring procedure is described, it is to be understood that this same method is carried out both with and without the film of interest on the metal, and that the film thickness is related to the difference in analyzer positions obtained by this procedure.

In the case of a film deposited on a clean, oxide-free surface, fairly large changes in analyzer position will occur. For example, a change of 2.3° will be obtained for a 48 angstrom unit film. In the case of an oil coating on tin plate having an oxide sublayer, a change of about 0.56° for a 48 angstrom unit thickness results. In addition, in measurements on commercially produced tin plate, the sharpness of the null is descreased due to the birefringence of the tin and the effects of surface roughness. Thus, although good results may be obtained in determining the light minimum directly for the case where the reflecting surface is bright and oxide free, the procedure does not yield sufficient accuracy when the reflecting surface is tin plate.

Although the null is difficult to determine directly in the case of tin plate, the curves defining the increase in intensity on either side of the null are symmetrical, meaning that if the analyzer is rotated in one direction from the null for a predetermined number of degrees, the light intensity passing therethrough will be the same as that which would pass through the analyzer if it were rotated in the opposite direction from the null for the same number of degrees. This factor is made use of in the present invention. The light passing through the analyzer is directed onto a photomultiplier tube and the analyzer is automatically rotated in one direction for a predetermined number of degrees from a starting point which lies in close proximity to the null position and then in the opposite direction through the starting point for the said predetermined number of degrees. The angular position of the analyzer on either side of the starting point is continually recorded until the light intensity sensed by the photomultiplier tube reaches a predetermined magnitude, at which point the recording process stops until the analyzer swings to the other side of the starting point where the process is repeated. Since the null point will be midway between the points at which the light intensity was sufficient to stop the recording process, it may be determined readily from the maximum angles measured on either side of the starting point. The invention thus eliminates the problems inherent in attempting to determine the null position directly.

The above and other objects and features of the invention will become readily apparent from the following detailed description taken in connection with the accompanying drawings which form a part of this specification and in which:

FIGURE 1 is a general overall illustration of the apparatus of the invention;

FIG. 2 is a schematic illustration of the operation of the optical portion of the apparatus shown in FIG. 1;

Figure 3:
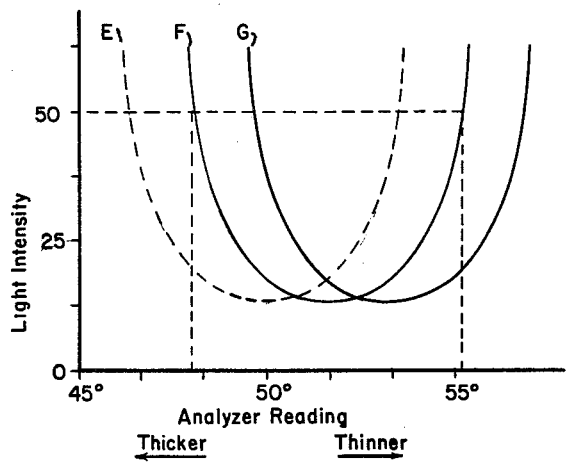
FIG. 3 is a graph illustrating the variation in light intensity through the analyzer shown in FIG. 1 for various angular positions.

Referring to FIG. 1, the numeral 10 designates a tin plate sample having a thin film of oil thereon. Sample 10 is positioned within a rectangularly shaped box or housing 12 having tubular shafts 14 and 16 positioned on perpendicularly opposed sides and in a common plane. The end of shaft 14 opposite box 12 is exposed to a source of monochromatic light, such as a sodium lamp 18, while a Nicol prism polarizer 20 is inserted in the tubular shaft 14 between sodium lamp 18 and the sample 10, substantially as shown. On the end of tubular shaft 16 opposite box 12 is a Nicol prism analyzer 22 which consists, essentially, of a polarizer rotatable about a central axis. Between analyzer 22 and the tin plate sample 10 is a compensator or quarter wave length plate 24 which converts elliptically polarized light reflected from sample 10 into plane polarized light which is then directed onto the analyzer 22. Surrounding the analyzer 22 is a ring gear 26 which meshes with a second gear 28. The shaft of gear 28, schematically illustrated at 30, is connected to gear reducer 32 which, in turn, is connected through mechanical linkage 34 to a reversible motor 36.

The operation of the optical equipment of FIG. 1 is schematically illustrated in FIG. 2. Thus, the output of the monochromatic light source 18 is symmetrical as indicated at A. After passing through the Nicol prism polarizer 20, however, the light beam is plane polarized as indicated at B. After being reflected from the film-coated tin plate sample 10, the light beam is elliptically polarized as at C. That is, the two components of polarization of the light striking sample 10 in and perpendicular to the plane of incidence are affected differently by reflection from the metal and by the film present on the metal. Originally equal in phase and amplitude, using a plane of polarization 45° or 135° to the plane of incidence, they now differ in both respects so that the reflected beam is elliptically polarized. The elliptically polarized beam is then passed through the quarter wave length plate 24 which converts the light back into plane polarized light as indicated at D. This plane polarized light is then directed onto the analyzer 22. As the analyzer 22 is rotated, the light intensity passing therethrough will vary from a minimum to a maximum at an angle of 90° with respect to the minimum position and then will decrease again to a minimum at an angle of 180° with respect to the original minimum position. Furthermore, the minimum angular position of the analyzer 22 will be dependent upon the thickness of the film on the sample 10.

The variation in light intensity through the analyzer for various angular positions is graphically illustrated in FIG. 3. The curves F and G are those obtained on tin plate with and without an applied oil film. When the tin plate sample has an oil film thereon, curve F will be produced with the null or point of minimum intensity occurring at about 51.6°. It will be noted that the increase in light intensity is the same or symmetrical on either side of the null. Thus, an arbitrary value of 50 for the light intensity passing through the analyzer will occur at equally spaced points from the null. For that matter, any value of the light intensity will occur at such equally spaced points. Furthermore, by noting the angular positions on either side of the null where the light intensity is the same, the position of the null itself may be determined since it will be midway between those positions. If the oil coating is removed from the tin plate sample, the curve will shift to the right as illustrated by curve G in FIG. 3 where the null now occurs at 53.3°. The difference in the angles corresponding to the minimal light values on curves F and G is related to the thickness of the oil film. Similarly, if the thickness of the oil film increases on the same tin plate sample with the sample placed in the same position and orientation as it was when curve F was obtained, then curve E might be produced where the null occurs at 50°. The thickness of the coating would be determined in this case from the minimal values of curves E and G. If the tin plate sample is changed, the curve F, obtained with no oil film applied, might shift to the right or left due to a change in the characteristics of the tin plate. The thickness of an oil film on this second sample, however, would still be determined by the difference in the minimal values obtained with and without the film applied.

Referring again to FIG. 1, concentric with the shaft 30 are three circular cams 38, 40 and 42 which are keyed or otherwise securely fastened thereto. For the expected range of film thicknesses on sample 10, the angular position of analyzer 22 for minimum intensity will vary through only a few degrees. The projection on cam 38 is indexed whereby it will close limit switch 44 midway between the limits of the two expected range of angular displacement. The projection on cam 40 is indexed so that it will close limit switch 46 after the analyzer 22 has rotated, say, 5° in one direction from the point at which limit switch 44 was closed; and the projection on cam 42 is indexed so that it will close limit switch 48 after the analyzer 22 has rotated in the opposite direction for 5° from the point at which limit switch 44 was closed. If it is assumed that shaft 30 is rotating in a clockwise direction, it will continue to so rotate until cam 42 closes limit switch 48, at which point the motor 36 will be reversed through cycle control circuit 50. The shaft 30 will then rotate in a counterclockwise direction until cam 40 closes limit switch 46 when cycle control circuit will again reverse motor 36. Thus, the shaft 30, as well as the analyzer 22, will oscillate back and forth for a predetermined number of degrees on either side of a starting point which is defined as the angular position of the analyzer 22 where cam 38 closes limit switch 44.

In order to sense the angular position of the analyzer 22 there is provided an electromechanical transducer, generally indicated at 52, which produces an electrical output proportional to the displacement of a movable core. As shown, the transducer includes a center or primary coil 54 connected to a source of alternating current 56. At either end of the primary center coil 54 and coaxial therewith are a pair of secondary coils 58 and 60. A rod-shaped magnetically permeable core 62 is positioned axially inside the coil assembly and provides a path for the magnetic flux linking the coils. Core 62 is connected through a mechanical linkage 64 to a stud or projection 66 on ring gear 26 whereby the core 62 will be moved axially within the coil assembly as the analyzer 22 is rotated.

When the primary or center coil 54 is energized with alternating current from source 56, voltages are induced in the two outer coils 58 and 60. These secondary coils are connected in series opposition, meaning that the two voltages in the secondary circuit are opposite in phase whereby the net output of the transformer as applied to rectifier 68 is the difference of the voltages. For one central position of the core this output voltage will be zero. When the core 62 is moved from this central position, the voltage induced in the coil toward which the core is moved increases, while the voltage induced in the opposite coil decreases. This produces a differential voltage output which with proper design varies linearly with the change in core position. Motion of the core in the opposite direction beyond the central position produces a similar linear voltage characteristic, with the phase shifted 180°. Thus, as analyzer 22 rotates in one direction the output of rectifier 68 will be a voltage of one polarity whose magnitude depends upon the angular displacement of the analyzer from the position at which the output of the transducer is zero. Similarly, when the analyzer 22 is rotated in the opposite direction, the rectifier 68 will produce a voltage of the opposite polarity whose magnitude is again dependent upon the angular position of the analyzer 22 with respect to the starting position where core 62 is at dead center.

The output of rectifier 68 is applied through voltage divider 70 and leads 72 and 74 to a recorder 76. The recorder 76 may comprise any of the well-known devices for continuously recording the magnitude and polarity of a direct current voltage. However, for illustrative purposes, the recorder 76 shown herein is of the type which includes continuously movable graph paper 78 traveling under a pen 80 which has a linear displacement dependent upon the magnitude of the voltage fed to the recorder. Thus, as the graph paper 78 moves in the direction of the arrow, the pen 80 will move to the right when the voltage input is positive, for example, and the distance which the pen moves to the right depends upon the magnitude of this positive voltage. Similarly, when the voltage is negative for the example given, the pen 80 will move to the left in an amount dependent upon the magnitude of the negative voltage.

Referring again to analyzer 22, the light passing therethrough is directed onto a photomultiplier 82 which will produce an output voltage having a magnitude proportional to the intensity of the light passing through the analyzer. The output signal of the photomultiplier is fed through an amplifier 84 to a relay 86 having a pair of normally open contacts 88. It will be noted that when the contacts 88 are closed, the leads 72 and 74 are effectively shorted. Whenever the output of the photomultiplier 82 reaches a predetermined magnitude, the relay 86 will be actuated, contacts 88 will close, and the voltage input to recorder 76 will drop to zero regardless of the position of core 62 in transducer 52. The contacts will be held in closed position by a trip solenoid 90. This solenoid is actuated to release the relay 86 and open contacts 88 only when limit switch 44 is closed by cam 38.

Figure 4A:
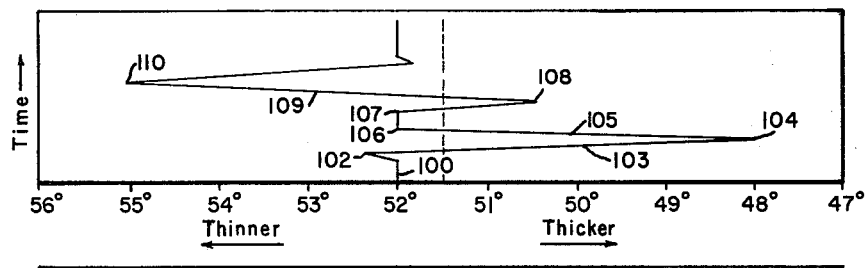
FIGS. 4A and 4B are examples of recorder readings obtained for various thicknesses with the apparatus shown in FIG. 1.
Figure 4B:
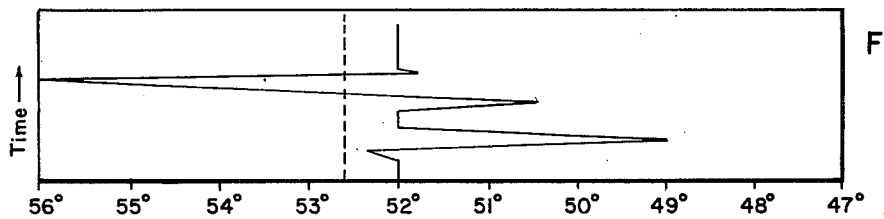

Operation of the invention may best be understood by reference to FIGS. 4A and 4B where the output of the recorder 76 is graphically illustrated with and without the oil film on sample 10. Each of the graphs in FIGS. 4A and 4B represents one complete cycle of the analyzer 22 as it oscillates back and forth through the null position or point of minimum light intensity. It will be assumed that when no voltage is applied to the recorder 76, the pen 80 will be at the 52° position. Initially, it will be assumed that analyzer 22 is rotating in a clockwise direction as viewed from the left so that the core 62 is moving downwardly as shown in FIG. 1. Under these circumstances, the cams 38, 40 and 42 will rotate in a counterclockwise direction. Furthermore, it will be assumed that at the beginning of the cycle the contacts 88 of relay 86 are closed so that the recorder 76 does not deviate from the central position which is indicated as 52° in FIGS. 4A and 4B. Thus, in FIG. 4A, where the sample is coated with oil, the start of the cycle is at 100 where contacts 88 are closed and cam 38 has not as yet closed limit switch 44. When cam 38 closes limit switch 44 to energize solenoid 90 and open contacts 88, however, the recorder pen 80 will move to the left as at 102. This is due to the fact that the cam 38 and transducer 52 are not exactly synchronized for the example given. That is, assuming the core 62 is moving downwardly, it will be slightly above dead center position when switch 44 is closed so that an output occurs at 102. As the analyzer 22 continues to rotate in a clockwise direction, the recorder pen 80 will move to the right along line 103 due to the fact that the voltage induced in coil 60 now exceeds that induced in coil 58. The voltage and the recorder pen displacement will continue to increase until point 104 is reached where the light intensity through analyzer 22 actuates relay 86 to close contacts 88. The point 104 might, for example, correspond to the point to the left of the null on curve F in FIG. 3 where the light intensity through the analyzer has a value of 50. When the contacts 88 close, the input to the recorder is shorted so that the pen 80 drifts back along line 105 to point 106 at 52° which is the central or starting position of the pen. At the same time, the analyzer 22 will continue to rotate in a clockwise direction until cam 40 closes limit switch 46 and reverses motor 36. The analyzer 22 will now rotate in a counterclockwise direction as viewed from the left until cam 38 again closes limit switch 44 to energize solenoid 90 and open contacts 88. The point at which this occurs on the graph is indicated by the numeral 107 in FIG. 4A. When the switch 44 closes, the core 62 is still below dead center position so that the recorder pen will again move to the right as at 108. This is due to the fact that the core and cam 38 are not exactly synchronized as was mentioned above. As the analyzer continues to move in a counterclockwise direction and the core 62 moves upwardly through its dead center position, the recorder pen will move to the left along line 109 since the voltage induced in coil 58 now exceeds that induced in coil 60. This action will continue until the photomultiplier 82 again actuates relay 86 to close contacts 88. This point is indicated at 110 in FIG. 4A and corresponds to the angular position to the right of the null of curve F in FIG. 3, for example, where the light intensity again reaches the value of 50. After contacts 88 close, the recorder pen 80 again drifts back to the central position of 52°. The analyzer 22, however, continues to rotate in a counterclockwise direction until cam 42 closes limit switch 48. This action reverses motor 36, and the analyzer 22 now rotates in a clockwise direction until cam 38 closes limit switch 44 to initiate a second cycle.

For the example given in FIG. 4A, the positions of equal intensity on either side of the starting point occurred at 48° and 55°, respectively. Remembering that these positions are equally spaced from the null position of the analyzer, the null position will be midway between these positions or at 51.5°. If the oil film on sample 10 is removed, the recorder output may appear as in FIG. 4B where the positions at which the photomultiplier 82 triggers relay 86 are 49° and 56°. Thus, the null position of the analyzer is midway between these readings or at 52.5°. By initially calibrating the equipment to correlate various known thicknesses to differences in null positions with and without the film present, as previously described, the thickness of the film on any sample may be determined. Thus, the difference in null positions $$(52.5° - 51.5° = 1°)$$

is a measure of the oil thickness. Another tin plate sample with the same oil thickness might give null values of 52.75° and 51.75°. The difference in absolute values of the individual readings is due to oxide variations on the tin plate; however, the difference between the two values is still the same (i.e., 1°), indicating the same film thickness.

The invention thus provides a means for easily and accurately determining the thickness of transparent oil films and the like. Since the operation of the device is completely automatic, it may be operated by unskilled personnel while at the same time insuring a high degree of accuracy. Although the invention has been shown in connection with a certain specific embodiment, it will be readily apparent to those skilled in the art that various changes in form and arrangement of parts may be made to suit requirements without departing from the spirit and scope of the invention. In this respect, it is apparent that the invention could also be used to obtain film thickness readings on clean and oxide-free surfaces. In this latter case thickness could be obtained directly from the reading obtained with the film applied since the characteristics of the reflecting surface would remain constant.

We claim as our invention:

1. Apparatus for measuring the thickness of a thin transparent film on the surface of reflective material comprising, in combination, optical means for producing a beam of plane-polarized light having an azimuth dependent upon the thickness of said film, an optical analyzer in the path of said beam of plane-polarized light, means for rotating said analyzer in one direction from a starting point for a predetermined number of degrees and then in the opposite direction through said starting point for said predetermined number of degrees on the other side of the starting point, photoelectric means for sensing the intensity of the light passing through the analyzer, a device connected to said analyzer for producing a direct current voltage which increases as the analyzer is rotated away from said starting point and which has one polarity when the analyzer is rotated to one side of the starting point and the opposite polarity when the analyzer is rotated to the other side of the starting point, means for recording the magnitude and the polarity of the voltage produced by said device, and relay means responsive to the output of said photoelectric means for shorting the input to said recording means when the intensity of the light sensed by said photoelectric means reaches a predetermined magnitude.

2. Apparatus for measuring the thickness of a thin transparent film on the surface of reflective material comprising, in combination, optical means for producing a beam of plane-polarized light having an azimuth dependent upon the thickness of said film, an optical analyzer in the path of said beam of plane-polarized light, means for rotating said analyzer in one direction from a starting point for a predetermined number of degrees and then in the opposite direction through said starting point for said predetermined number of degrees on the other side of the starting point, photoelectric means for sensing the intensity of the light passing through the analyzer, a device connected to said analyzer for producing a varying electrical signal indicative of the angular position of the analyzer with respect to said starting point, means for recording said electrical signal, and apparatus responsive to the output of said photoelectric means for preventing application of said electrical signal to said recording means when the intensity of the light passing through said analyzer reaches a predetermined magnitude.

3. Apparatus for measuring the thickness of a thin transparent film on the surface of reflective material comprising, in combination, optical means for producing a beam of plane-polarized light having an azimuth dependent upon the thickness of said film, an optical analyzer in the path of said beam of plane-polarized light, means for rotating said analyzer in one direction from a starting point for a predetermined number of degrees and then in the opposite direction through said starting point for said predetermined number of degrees on the other side of the starting point, photoelectric means for sensing the intensity of the light passing through the analyzer, an electromechanical transducer having a magnetically permeable core mechanically connected to said analyzer, first, second and third windings axially spaced along said core, a source of alternating current voltage connected to the center one of said windings, means connecting the other two windings in series opposition, a device for rectifying the resulting voltage produced across said other two windings, means for recording the magnitude and phase of the output of said rectifying device, and relay means responsive to the output of said photoelectric means for disrupting the application of the output of said rectifying device to said recording means when the light intensity through said analyzer reaches a predetermined magnitude.

4. Apparatus for measuring the thickness of a thin transparent film on the surface of reflective material comprising, in combination, optical means for producing a beam of plane-polarized light having an azimuth dependent upon the thickness of said film, an optical analyzer in the path of said beam of plane-polarized light, means for rotating said analyzer in one direction from a starting point for a predetermined number of degrees and then in the opposite direction through said starting point for said predetermined number of degrees on the other side of the starting point, photoelectric means for sensing the intensity of the light passing through the analyzer, a device connected to said analyzer for producing a varying electrical signal indicative of the angular position of the analyzer with respect to said starting point, means for recording said electrical signal, circuit means for applying the output of said device to said recording means, apparatus responsive to the output of said photoelectric means for disabling said circuit means to apply the output of said device to the recording means whenever the intensity of the light passing through the analyzer reaches a predetermined magnitude, and means for enabling said circuit means to pass the output of said device to said recording means whenever the analyzer is rotated through said starting point.

5. The combination claimed in claim 4 wherein the disabling means comprises a device for shorting the input to said recording means and wherein the enabling means comprises a device actuable by a cam mechanically connected to said analyzer for removing said short.

6. Apparatus for measuring the thickness of a thin transparent film on the surface of reflective material comprising, in combination, optical means for producing a beam of plane-polarized light having an azimuth dependent upon the thickness of said film, an optical analyzer in the path of said beam of plane-polarized light, a reversible motor for rotating said analyzer back and forth through a starting angular position which lies in close proximity to the angular position of the analyzer where the intensity of the light passing therethrough is at a minimum, means including cam-operated limit switches mechanically connected to said analyzer for reversing said motor at predetermined angular positions of the analyzer on either side of said starting angular position, photoelectric means for sensing the intensity of the light passing through said analyzer, a device connected to said analyzer for producing a varying electrical signal indicative of the angular position of the analyzer with respect to said starting angular position, means for recording said electrical signal, and apparatus responsive to the output of said photo-electric means for preventing passage of said signal to the recording means when the intensity of the light passing through the analyzer reaches a predetermined magnitude.

7. Apparatus for measuring the thickness of a thin transparent film on the surface of reflective material comprising, in combination, optical means for producing a beam of plane-polarized light having an azimuth dependent upon the thickness of said film, an optical analyzer in the path of said beam of plane-polarized light, a reversible motor for rotating said analyzer back and forth through a starting angular position which lies in close proximity to the angular position of the analyzer where the intensity of the light passing therethrough is at a minimum, photoelectric means for sensing the intensity of the light passing through said analyzer, a device connected to said analyzer for producing a varying electrical signal indicative of the angular position of the analyzer with respect to said starting angular position, means for recording said electrical signal, and apparatus responsive to the output of said photo-electric means for preventing passage of said signal to the recording means when the intensity of the light passing through the analyzer reaches a predetermined magnitude.

8. Apparatus for measuring the thickness of a thin transparent film on the surface of reflective material comprising, in combination, means for supporting a specimen having a reflective surface with a thin transparent film thereon, means for applying plane polarized light to said filmed surface at an angle thereto whereby the light reflected from the filmed surface is elliptically polarized, means for converting the elliptically polarized light to plane polarized light, an optical analyzer in the path of said latter-mentioned plane polarized light, means for rotating said analyzer in one direction from a starting point for a predetermined number of degrees and then in the opposite direction through said starting point for said predetermined number of degrees on the other side of the starting point, photoelectric means for sensing the intensity of the light passing through the analyzer, a device connected to said analyzer for producing a varying electrical signal indicative of the angular position of the analyzer with respect to said starting point, means for recording said electrical signal, and apparatus responsive to the output of said photoelectric means for shorting the input to said recording means when the intensity of the light passing through said analyzer reaches a predetermined magnitude.

9. Apparatus for measuring the thickness of a thin transparent film on the surface of reflective material comprising, in combination, means for supporting a specimen having a reflective surface with a thin transparent film thereon, means for applying plane polarized light to said filmed surface at an angle thereto whereby the light reflected from the filmed surface is elliptically polarized, means for converting the elliptically polarized light to plane polarized light, an optical analyzer in the path of said latter-mentioned plane polarized light, a reversible motor for rotating said analyzer back and forth through a starting angular position which lies in close proximity to the angular position of the analyzer where the intensity of the light passing therethrough is at a minimum, photoelectric means for sensing the intensity of the light passing through said analyzer, a device connected to said analyzer for producing a varying electrical signal indicative of the angular position of the analyzer with respect to said starting angular position, means for recording said electrical signal, and apparatus responsive to the output of said photoelectric means for preventing passage of said signal to the recording means when the intensity of the light passing through the analyzer reaches a predetermined magnitude.

10. Apparatus for measuring the thickness of a thin transparent film on the surface of reflective material comprising, in combination, means for supporting a specimen having a reflective surface with a thin transparent film thereon, means for applying plane polarized monochromatic light to said filmed surface at an angle thereto whereby the light reflected from the filmed surface is elliptically polarized, means for converting the elliptically polarized light to plane polarized light, an optical analyzer in the path of said latter-mentioned plane polarized light, means for rotating said analyzer in one direction from a starting position for a predetermined number of degrees and then in the opposite direction through said starting position for said predetermined number of degrees on the other side of the starting position, photoelectric means for sensing the intensity of the light passing through the analyzer, a device connected to said analyzer for producing a varying electrical signal indicative of the angular position of the analyzer with respect to said starting point, means for recording said electrical signal, circuit means for applying the output of said device to said recording means, apparatus responsive to the output of said photoelectric means for disabling said circuit means to apply the output of said device to the recording means whenever the intensity of the light passing through the analyzer reaches a predetermined magnitude, and means for enabling said circuit means to pass the output of said device to said recording means whenever the analyzer is rotated through said starting point.

11. Apparatus for measuring the thickness of a thin transparent film on the surface of reflective material comprising, in combination, optical means for producing a beam of plane-polarized light having a plane of polarization dependent upon the thickness of said film, an optical analyzer in the path of said beam of plane-polarized light, means for rotating said analyzer in one direction from a starting point for a predetermined number of degrees and then in the opposite direction through said starting point for said predetermined number of degrees on the other side of the starting point, photoelectric means for sensing the intensity of the light passing through the analyzer, a device connected to said analyzer for producing a varying electrical signal indicative of the angular position of the analyzer with respect to said starting point, and apparatus responsive to the output of said photoelectric means and said varying electrical signal for permanently recording the angle on either side of said starting point where the intensity of the light passing through the analyzer reaches a predetermined magnitude.

12. Apparatus for measuring the thickness of a thin transparent film on the surface of reflective material comprising, in combination, optical means for producing a beam of plane-polarized light having a plane of polarization dependent upon the thickness of said film, an optical analyzer in the path of said beam of plane-polarized light, motor means for automatically rotating said analyzer in one direction from a starting point for a predetermined number of degrees and then in the opposite direction through said starting point for said predetermined number of degrees on the other side of the starting point, a photoelectric device responsive to the intensity of the light passing through said analyzer and adapted to produce an electrical signal indicative of the intensity of said light, and means including a transducer device operatively connected to said analyzer and responsive to the electrical signal from said photoelectric device for permanently recording the angle on either side of said starting point where the intensity of the light passing through the analyzer reaches a predetermined magnitude.

References Cited in the file of this patent

UNITED STATES PATENTS

| | | |
|---|---|---|
| 2,388,727 | Dench | Nov. 13, 1945 |
| 2,437,323 | Heigl et al. | Mar. 9, 1948 |
| 2,666,355 | Trurnit | Jan. 19, 1954 |
| 2,974,561 | Hardy et al. | Mar. 14, 1961 |

OTHER REFERENCES

Rothen: "The Ellipsomer, an Apparatus to Measure Thickness of Thin Surface Films," The Review of Scientific Instruments, volume 16, No. 2, February 1945, pages 26–30.

Levey: "A Recording Polarimeter," The Review of Scientific Instruments, volume 21, No. 8, August 1950, pages 693–698.